United States Patent [19]

Mendenhall et al.

[11] Patent Number: 5,230,029
[45] Date of Patent: Jul. 20, 1993

[54] ELECTROMAGNETIC SCATTERING IN ACTIVE GUIDES

[75] Inventors: Scott N. Mendenhall; Oscar M. Stafsudd, both of Los Angeles; Nocolaos G. Alexopoulos, Santa Monica, all of Calif.

[73] Assignee: The Regents of the University of California, Alameda, Calif.

[21] Appl. No.: 814,369

[22] Filed: Dec. 24, 1991

Related U.S. Application Data

[62] Division of Ser. No. 359,770, May 31, 1989, Pat. No. 5,090,017.

[51] Int. Cl.$^5$ ............................ G02B 6/10; G01B 9/02
[52] U.S. Cl. ...................................... 385/27; 356/350; 372/7; 385/130
[58] Field of Search ...................... 356/350; 372/45, 50, 372/3-7, 94, 108; 307/425, 427, 428, 430; 385/14, 129, 130, 24, 25, 27, 28, 29; 359/326, 328, 329, 332

[56] References Cited

U.S. PATENT DOCUMENTS

| 3,515,897 | 6/1970 | Culver | 307/426 |
| 3,898,585 | 8/1975 | Heidrich | 372/7 |
| 4,616,898 | 10/1986 | Hicks, Jr. | 350/96.15 |
| 4,658,401 | 4/1987 | Segré et al. | 372/26 |
| 4,676,583 | 6/1987 | Hicks, Jr. | 350/96.15 |
| 4,778,238 | 10/1988 | Hicks | 350/96.16 |
| 5,101,413 | 3/1992 | Botez | 372/50 |

OTHER PUBLICATIONS

"Electromagnetic scattering from active objects: invisible scatterers", *Applied Optics*, Alexopoulos et al., vol. 17: 235, Jan. 15, 1978.
"Electromagnetic scattering from active objects", *Applied Optics*, Milton Kerker, vol. 17: 3337, Nov. 1, 1978.
"Resonances in electromagnetic scattering by objects with negative absorption", *Applied Optics*, Milton Kerker, vol. 18: 1180, Apr. 15, 1979.
"Reflection coefficients of large active scatterers", *Journal Applied Physics*, Ariel Cohen, vol. 58: 7, 2437-2440 (1985).

*Primary Examiner*—Frank Gonzalez
*Attorney, Agent, or Firm*—Charles Berman

[57] ABSTRACT

Non-normal plane wave electromagnetic scattering from active guiding structures, such as dielectric films, generates large resonances at discrete plane-wave angles of incidence relative to an interface with the active film. These resonances are generated from a "leaky" wave phase matching condition. Enhancement in the scattered field intensities on the order of 100 is achieved using finite diameter pump and probe laser beams and active films as thin as 6 microns. Solid state and dye lasers with unique characteristics are obtained. Oscillators, amplifiers, gyroscopic and nonlinear laser applications employing the active guiding structure or film provide enhanced performance.

19 Claims, 6 Drawing Sheets

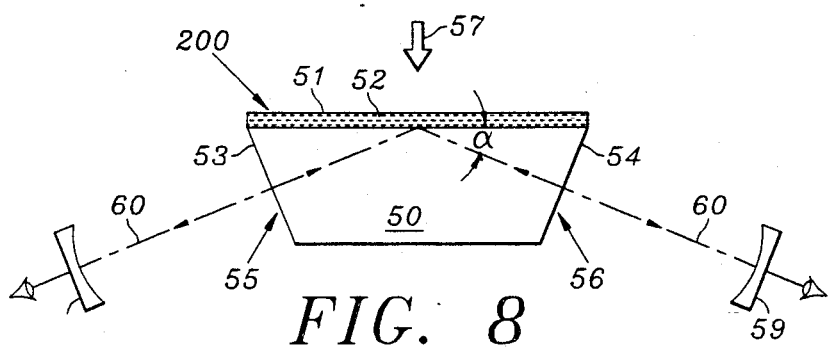
FIG. 8
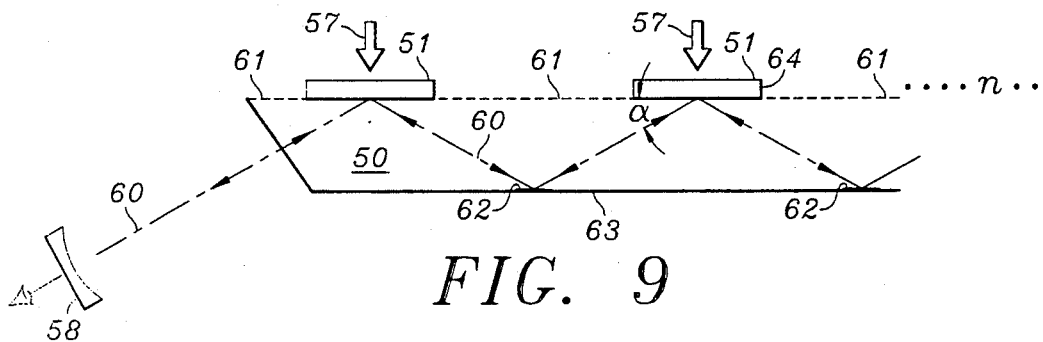
FIG. 9
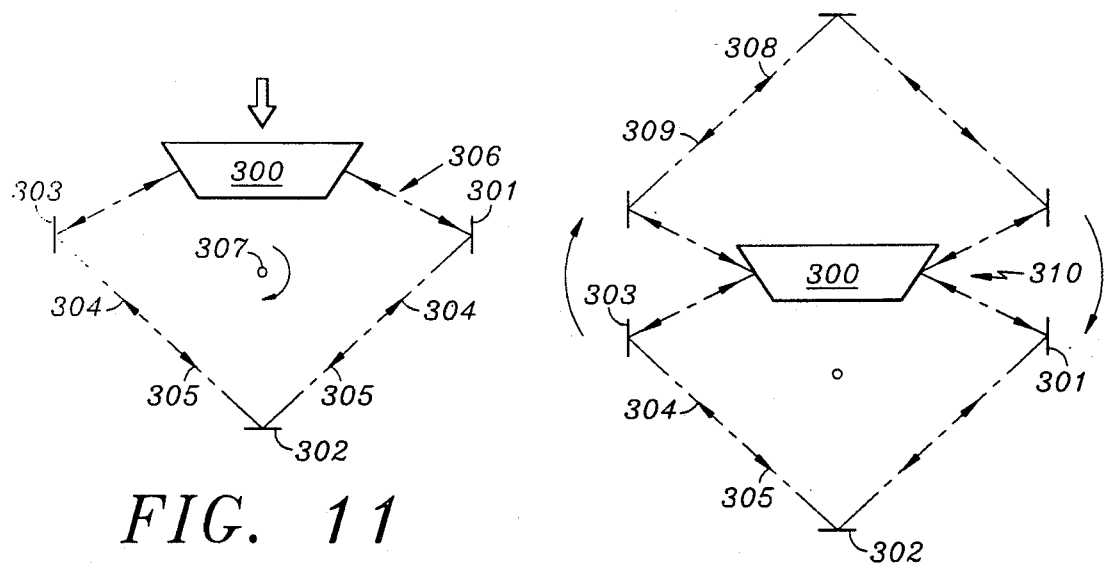
FIG. 11
FIG. 12

ELECTROMAGNETIC SCATTERING IN ACTIVE GUIDES

This invention was made with Government support under Grant Contract No. ECS-86-04836 awarded by the National Science Foundation. The Government has certain rights in this invention.

This is a division of application Ser. No. 359,770, filed May 31, 1989, now U.S. Pat. No. 5,090,017.

BACKGROUND

This invention relates to electromagnetic scattering. In particular the invention is concerned with enhancing the output of electromagnetic radiation from an active guiding structure such as a dielectric film. The invention is directed to the development of an enhanced electromagnetic radiation beam from a leaky wave guiding structure which permits for the enhancement in scattered field outputs on the order of many magnitudes greater than has been thought to be previously possible.

The invention is also concerned with lasers, laser beams and active structures or films of a dielectric medium, where the guiding structures or films are activated with an inverted atomic or molecular population. Enhancement of beams of electromagnetic radiation at arbitrary frequencies, for instance, microwave, RF, millimeter wave, IR, visible and UV are also the subject of the invention. In this regard, for instance, the invention is invention. In this regard, for instance, the invention is concerned with a system for enhanced transmission with active dielectric structures so as to improve the transmission characteristics with different wave guiding structures.

The scattering behavior of active objects has previously attracted theoretical attention. Such theoretical considerations has concerned normal-incidence plane wave scattering from active dielectric structures. Also, such theoretical analysis has been inconclusive and has not suggested the ability to achieve large gains and minute particle sizes so as to be effects which are significant and useful It is accordingly an object to provide methods, systems, devices, and apparatus for enhancing the output of electromagnetic radiation from active guiding structures. It is also an object to provide significant and useful outputs with high effective gain and energy extraction, and to obtain unique and efficient lasers using significant active scattering effects.

SUMMARY

The invention provides for the output of electromagnetic radiation waves to be enhanced by an activated guiding structure which supports leaky signals such as waves. By the term "leaky" the Applicants include guiding or waveguiding structures which permit a wave to, at least partly, pass through an interface between the guiding structure and its surroundings. By the term "activated" the Applicants intend to cover producing a gain in any guiding structure.

According to the invention a signal of electromagnetic radiation at a selected frequency is directed into an active guiding structure at a predetermined non-normal angle relative to the structure interface with the surrounding at an opposite face to the structure. An enhanced output electromagnetic radiation signal is obtained, and this is at least one of the reflected signal or the transmitted signal from the structure interface. The selected non-normal angle is predetermined to effect resonant interaction in the guiding structure at the frequency of the electromagnetic radiation. Resonant interaction is effected between the input signal and an unattenuated "leaky" guiding mode induced in the structure during scattering. The output reflected or transmitted electromagnetic radiation signal is enhanced in gain and energy extraction at the selected frequency.

The guiding structure is an active dielectric medium and can selectively be a cylinder, sheet, sphere, elliptical or circular fiber, or other shape suitable to support resonant interaction. The refractive index of the guiding structure is different to the surrounding refractive index. This permits for enhancement of the scattered field intensity many magnitudes of order higher than a system in non-resonance. The electromagnetic input signal is a beam which is phase matched to the scattering in the active dielectric medium.

In one preferred form of the invention, the non-normal wave is an oblique plane-wave. The angle is a relative grazing angle and is in a range of about 25° to 28° relative to the interface in the exemplary experiments (glass-dye solution). The exact angular range depends upon the actual indices and thicknesses, but typically the angles are close to the critical angle for the boundary interface. Scattering is developed from a planar three-layer guiding dielectric structure wherein the central layer is active. The refractive index of the dielectric structure which is the central layer is different to the refractive index of at least one of the surrounding layers.

Scaling of active guiding structures can be effected by locating active elements in relative series location. The electromagnetic input signal can be laser generated or be different electromagnetic radiation.

The active guiding structure can be any selected medium for lasing, including, dye, gas, and semiconductor, such as diode laser. The guiding structure can be symmetrical or asymmetrical. The guiding structure can selectively be multiple interlayers of active guiding structures with non-active interlayering. The input signal may be a planar or non-planar wave, such as a cylindrical wave. The characteristics of the structure and input nature of the wave are selectable to provide the desired characteristics of the output wave.

The invention is now further described and illustrated with reference to the accompanying drawings.

DRAWINGS

Figure 6:
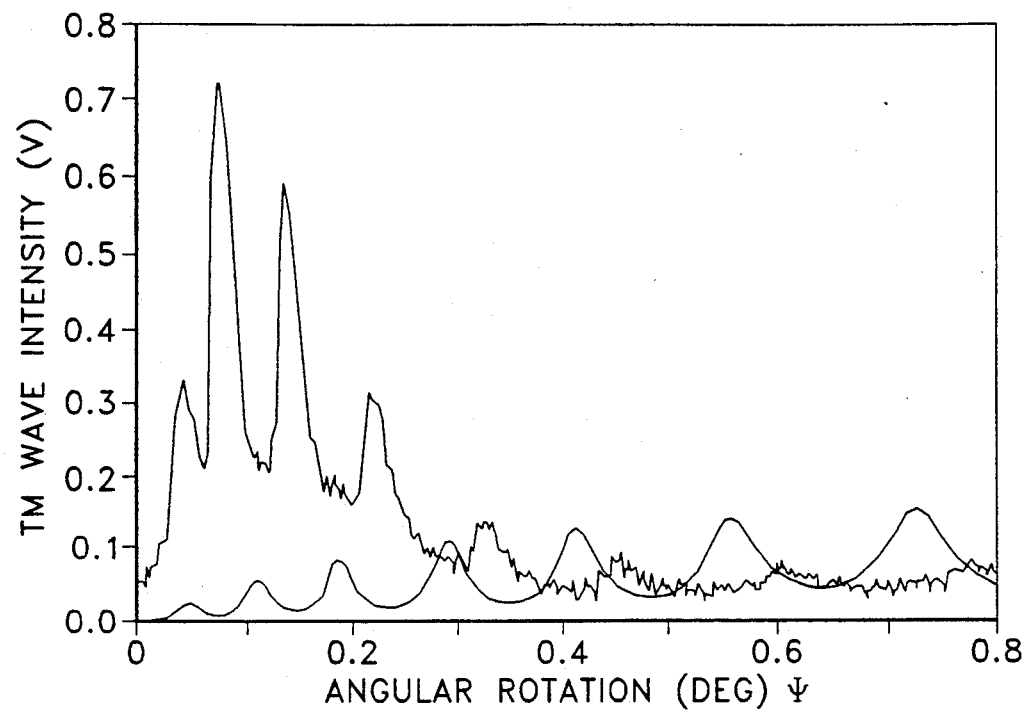

FIG. 6 illustrates the measured transmitted TM probe beam intensity as a function of prism angle rotation for a 12 micron thick dielectric film. The upper trace shows the transmitted intensity with the pump beam present, namely active scattering. The lower trace, illustrates intensity with the pump beam absent, namely passive scattering.

Figure 7:
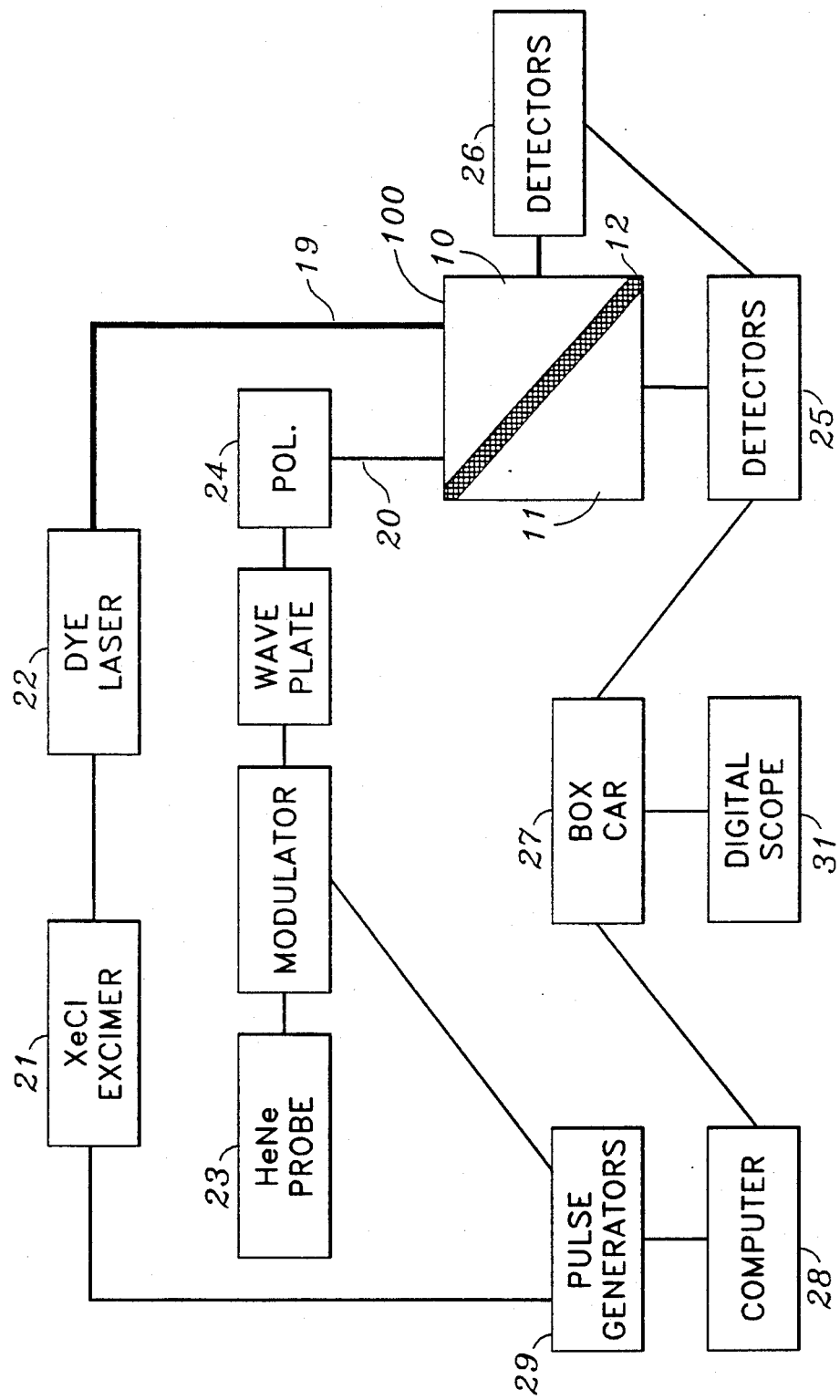

FIG. 7 is a block diagram illustrating the relationship of the various components for generating the appropriate laser beams, and conducting the experiments whereby electromagnetic radiation scattering from the active dielectric is measured and evaluated.

FIG. 8 is an exemplary asymmetrical semiconductor structure illustrating the leaky wave guiding characteristics in a solid stat embodiment.

FIG. 9 is a scaled construction of the semiconductor structure of FIG. 8 illustrating multiple guiding structures in a relative series relationship.

Figure 10:
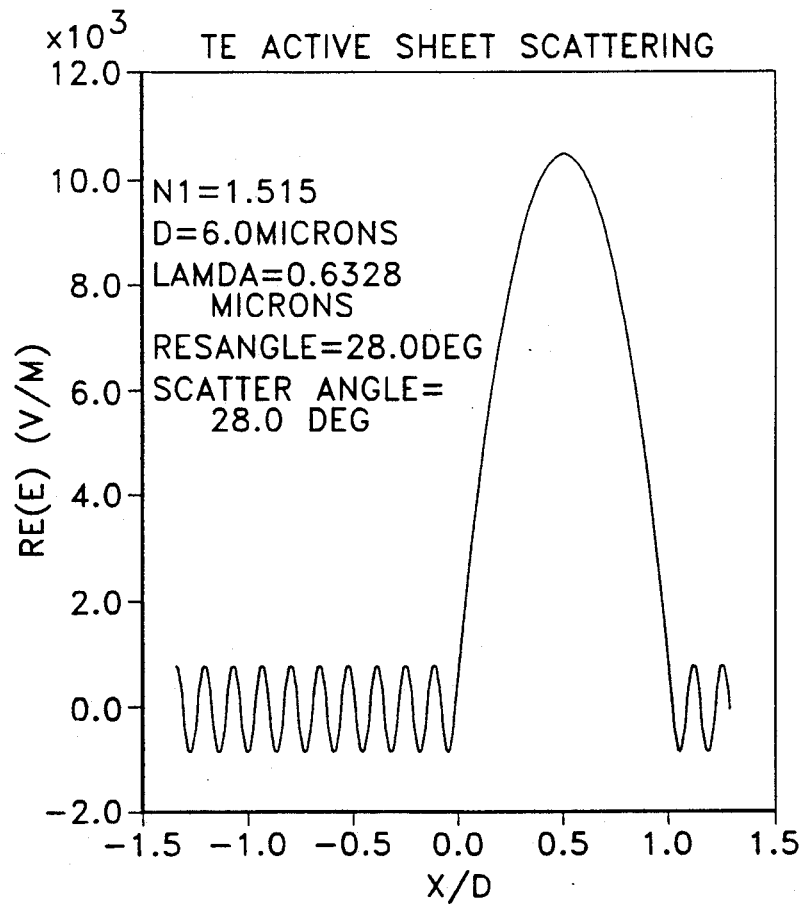

FIG. 10 is a plot of induced field intensity spatial distribution of the second TE unattenuated "leaky" waveguide mode at a resonant incidence angle illustrating the field increase in the active region.

FIG. 11 is a diagrammatic illustration of a first gyroscopic application of the system.

FIG. 12 is a diagrammatic illustration of a second gyroscopic application of the system.

DESCRIPTION

Figure 1:
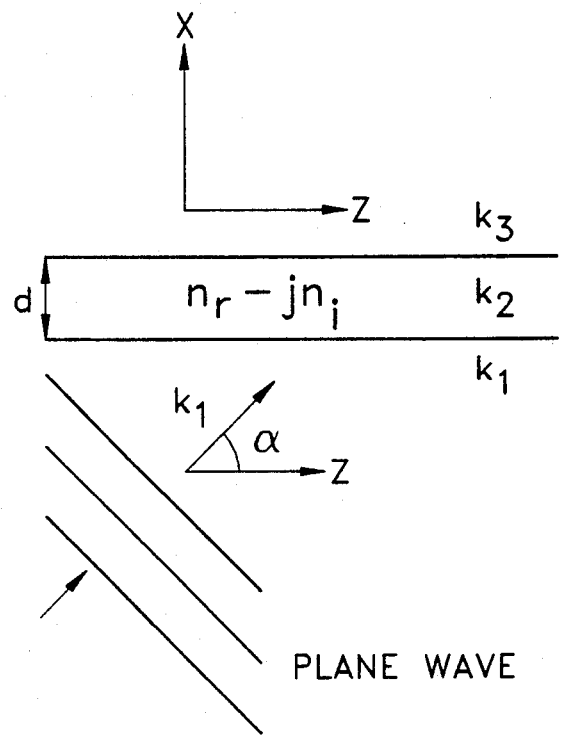
FIG. 1 illustrates plane-wave scattering geometry. $k_1$, $k_2$ and $k_3$ are the plane-wave propagation constants in a three layer planar dielectric waveguiding structure.

The results of non-normal plane-wave scattering from a planar three-layer guiding structure as illustrated in FIG. 1 in which the central dielectric film or layer is active are described. The refractive index of the central layer 80 is given by $n_{2a} = n_{2r} - jn'_{2i}$. ($e^{-j\omega t}$ time dependence is assumed). A fine-grained scan of the plane-wave incidence angle, has revealed the existence of narrow discrete angles where large amplitude scattering resonance is obtained. Enhancements in the scattered field intensities on the order of 100 have been observed using active films 80 as thin as 6 microns.

Figure 2:
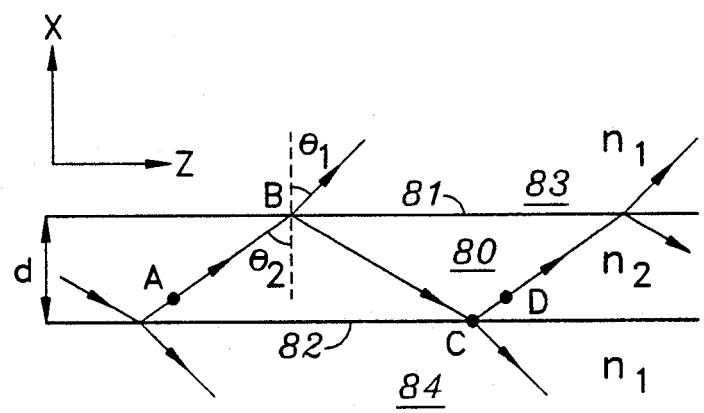
FIG. 2 illustrates a "leaky" waveguide mode on a symmetric dielectric waveguiding structure. $n_1$, $n_2$, and $n_3$ are refractive indices of the surroundings, structure and surrounding respectively.

Resonant scattering in an active dielectric film 80 is considered with leaky waveguide modes using a zig-zag ray model. FIG. 2 depicts such a mode on a symmetric dielectric slab waveguiding structure. The propagation of a leaky waveguide mode in the central or interior region 80 is governed by $\exp(j(\pm h_2 x + pz))$. $h_2$ is the transverse propagation constant in the central region, 80, and p is the longitudinal propagation constant for the structure. The leaky waveguide modes occur at discrete angular orientations due to the requirement that the transverse phase repeat within an integral multiple of $2\pi$ on a path such as ABCD. Each interface 81 and 82 with the surroundings 83 and 84 only partially reflects energy. This energy leaks from the interior central region 80, namely the dielectric film or guiding structure, to the exterior surrounding regions 83 and 84. This decrease in energy with distance down the guiding structure causes the propagation constant p (and $h_2$) for such a mode in an otherwise lossless system to be complex. In a passive lossless structure, leaky waveguide modes exist if $\sin \theta_2 \leq n_1/n_2$. If $n_2 \geq n_1$, the leaky modes correspond to those beyond cutoff ($\theta_2 < \theta_c$) namely the critical angle.

A plane wave incident upon a passive, lossless planar waveguiding structure SO does not efficiently excite leaky waveguide modes, since the phase factor for the incident wave $\cos \alpha$ (FIG. 1) cannot be equal to the complex value $p = \beta + j$ When the interior region 80 is active, the structure 80 is capable of supporting unattenuated leaky waveguiding modes, namely modes in which p is real. If in addition $p = \beta = k_1 \cos \alpha$, then phase matching between the incident wave and the unattenuated leaky waveguide mode is achieved and resonant electromagnetic scattering results. An unattenuated leaky waveguide mode repeats in intensity and transverse phase on a path such as ABCD (FIG. 2). The intensity condition is achieved when the gain coefficient of the active region is such that the energy leakage per Fresnel reflection is counterbalanced by the energy gained in propagating between reflections. For the symmetric structure of FIG. 2 resonant leaky waveguide modes obey an intensity condition and a phase condition given approximately by $$1 - R_{21} e^{gsd}/\cos \theta_{2S} = 0 \tag{1}$$

$$\cos \theta_{2X} = \lambda_{os}/2n_{2r}d, \ s = 1, 2, 3 \ldots \tag{2}$$

where $R_{21}$ is the TE(TM) Fresnel intensity coefficient of reflection at the 2-1 (80-83) boundary, is the free-space wavelength of the waveguide mode, s is the mode index and g is the required intensity gain coefficient in the active dielectric film. $n_{2i} = g\lambda_o/4\pi$ is ignored in equation (2) and in the determination of $R_{21}$. Ignoring $n_{2i}$ is a good approximation for visible wavelengths and available gain coefficients. For high $n_{2i}$ gain laser dyes, $g \geq 50$ cm$^{-1}$ and with $= 0.6328$ microns, $n_{2i} > 0.0003$, the resonant scattering angle $\alpha_s$ corresponding to mode s is deduced from Snell's law to be:

$$\alpha_s = \arccos\left(\frac{n_{2r} \sin \theta_{2s}}{n_i}\right)$$

Figure 3:
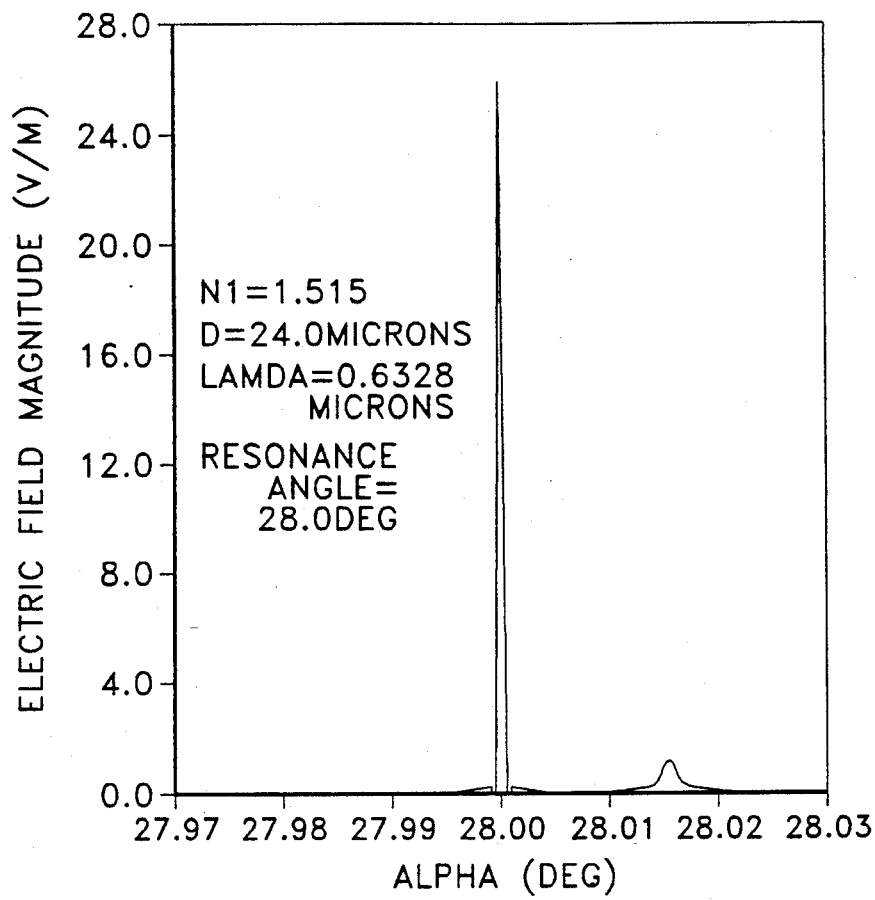
FIG. 3 illustrates an electric field magnitude for the first TE mode at a fixed point in space as a function of scattering angle for a symmetric dielectric waveguiding structure. $n_2 = 1.33773 - j0.15328 \times 10^{-5}$ producing resonant scattering at a resonance scattering angle of 28 degrees.
Figure 4:
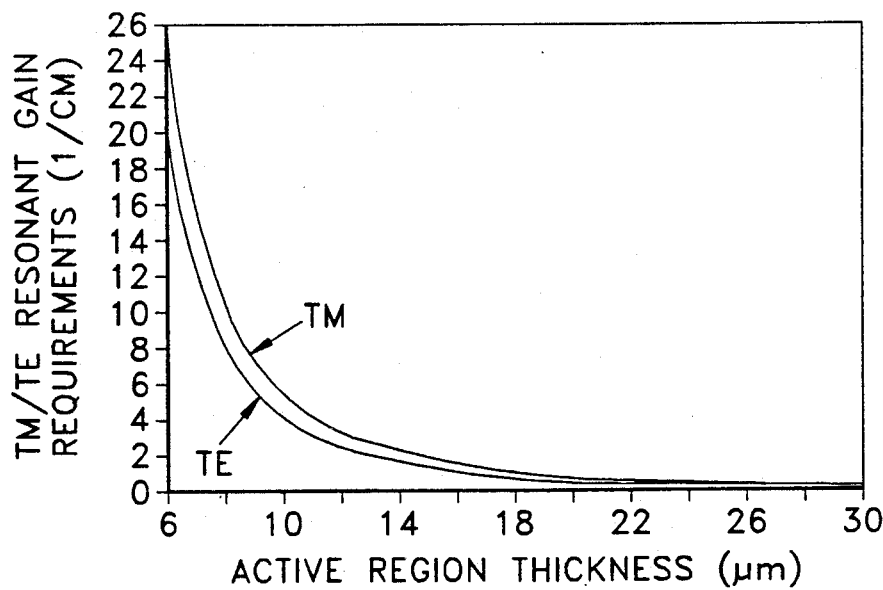
FIG. 4 illustrates the intensity gain coefficient required to produce resonant TM/TE scattering in the first mode as a function of active film thickness for a symmetric dielectric waveguiding structure ($n_1 = 1.515$, $n_{2r} = 1.35$).

A computational procedure was developed and applied to a solution of Maxwell's equations for the symmetric scattering problem. Typical results of these calculations are shown in FIGS. 3 and 4. Scattering resonance is achieved at discrete plane wave incidence angles. The gain required for resonant scattering decreases rapidly with increasing active region 80 thickness, d. There is agreement between the theory derived using the zig-zag ray model and the Maxwell wave theory for the first two resonant modes with $$\frac{n_{2r}d}{\lambda_o}/\lambda_o \geq 10 \text{ and } n_1/n_{2r} > 1.10$$

In FIG. 3 the resonance is effected at the incidence angle of 28 degrees relative to the interface between the surrounding and guiding structure 80. The dielectric film or central region guiding structure 80 thickness is 24 $\mu$m. The electric field intensity output signal is sharply enhanced when the incidence angle of the output signal permits for resonance in the active structure 80. At other incidence angles the output signal intensity is relatively negligible.

In FIG. 4, it can be seen that, for instance, for a gain of 0.02 as obtained in a typical Nd:YAG laser the active medium need be about 26 $\mu$m to 30 $\mu$m thickness. For 6 $\mu$m thickness active regions 80 it is necessary to have a gain in the region 80 of about 22 to 26 which is also significant and attainable to provide useful results. The required gain to achieve resonance decreases rapidly with increasing dielectric film thickness d.

Figures 5A, 5B:
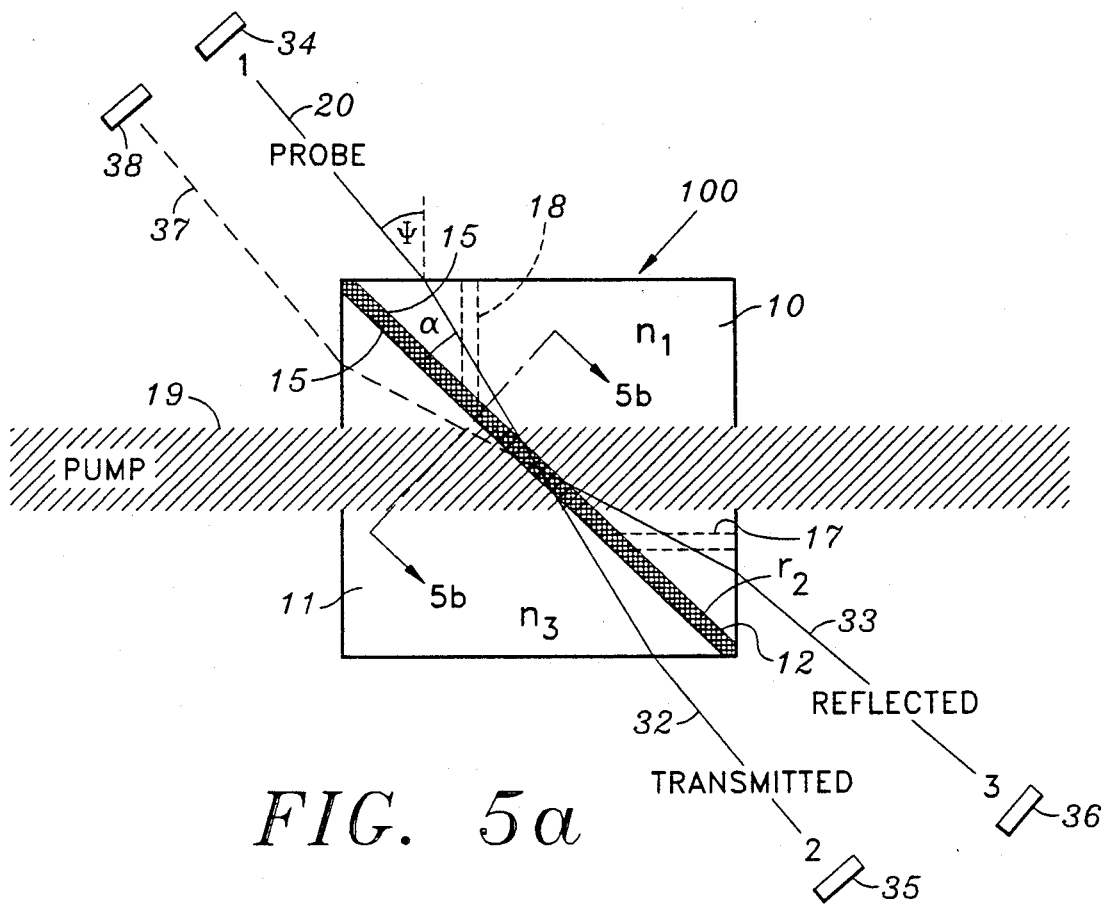
FIGS. 5a and 5b illustrate an experimental diagrammatic geometry cross-sectional view for finite diameter laser beam tests of resonant scattering in an active dielectric film.

Pulsed laser experiments were performed with the construction of FIGS. 5a, 5b, and 6, and components of FIG. 7, to study electromagnetic scattering from active dielectric layers.

A symmetric three-layer active dielectric structure 100 used two identical glass prisms 10 and 11 as indicated in FIGS. 5a and 5b. The prisms 10 and 11 were separated by a thin, 6 μm, layer of organic laser dye solution 12 whose real refractive index is nearly equal to that of solvent.

Mechanical separation of the prisms 10 and 11 and containment of the dye solution 12 was achieved using a thin gasket 13 fashioned from polyvinyl fluoride sheet material. The prisms 10 and 11 were mounted in a clamping device with the gasket 13 in place along the common boundary 14 of the prisms 10 and 11. Dye solution 12 was flowed in the interfacial region forming a guiding structure of thin liquid dielectric film or sheet 12 confined by the abutting prism faces 15 and the inner edge 16 of the gasket 13. The faces 15 of prisms 10 and 11 form the surroundings for the guiding structure 12. The dye solution 12 was pumped across this thin containment film of dye 12 via supply and return ports 17 and 18 drilled in one of the prisms 10. Active scattering was achieved by exciting the laser dye 12 with a short powerful pump pulse 19 while simultaneously scattering from the excited active region 12 with a probe beam 20 of differing frequency.

The laser dye 12 used in the experiment was Rhodamine 101 in a concentration of approximately 1.76 grams per liter of solvent. A pure methanol solvent, refractive index $=1.330\pm0.001$, was assumed. The prisms 10 and 11 have a refractive index equal to $1.515+0.001$ and were originally a matched pair used in a cubic beam splitter with a two inch edge dimension. The wavelength of the pump beam 19 was chosen to be 0.5100 μm and was produced by a XeCl excimer 21 pumped dye laser 22 delivering approximately 1 mJ of energy in a 20 nS pulse. The probe beam 20 was derived from a polarized 1 mW helium neon laser 23 operating at a wavelength of 0.6328 μm.

Active electromagnetic scattering experiments were performed with the incident probe beam 20 in a continuous wave mode. The probe beam 20 was in the input signal. The incident probe beam 20 polarization was selected by a precision half-wave compensator 24 before entering the dielectric structure 100. The prisms 10 and 11 and clamping apparatus were mounted on a rotation stage and driven by a computer controlled stepper motor. The angular resolution of this system was approximately $2.5\times10^{-3}$ degrees per full motor step. The probe beam 20 was scattered by the active guiding structure 12, to develop output signals, being a transmitted signal and a reflected signal. These output signals were thereafter deflected by a flat mirror into a detector system approximately two meters away.

The detector system consisted of two identical 1 cm$^2$ area silicon pin detectors 25 and 26 and a polarizing beam splitting cube mounted inside a light proof holographic camera box. The probe beam 20 as scattered entered the detector boxes 25 and 26 through a helium neon laser line filter whose wavelength passband was approximately $\pm0.0001$ μm centered on 0.6328 μm. It then entered a polarizing beam splitter where TM polarized light, whose magnetic field is parallel to the active prism interface 15 was passed to the first detector 25. TE polarized light, whose electric field is parallel to the active prism interface 15, was deflected 90 degrees away to the second detector 26.

The placement of the detector systems 25 and 26 and the use of a narrow band filter at its input served to minimize the fluorescence signal produced by the interaction of the pump pulse 19 and the laser dye medium 12. Fluorescence accounted for as much as 25 percent of the resonantly scattered signal with a 24 μm thick active layer. With a 6 μm active layer thickness, the fluorescence was negligible.

Electromagnetic scattering data were collected by driving the rotation stage stepper motor one step at a time thus achieving a fine-grained scan of the scattering incidence angle o of the input signal, being probe beam 20. Between steps each scattering event was detected and stored as a voltage amplitude in the sample and hold register of a boxcar integrator 27 synchronized to the pump laser 19. The voltage amplitudes were read by a computer interface module 28 and averaged in software over several pump pulses. Only a few, typically three, scattering events were needed to be averaged in software due to efficient shot-to-shot repeatability (0.1 percent) of the pump laser system 21 and 22. The results were a recording of average scattered power versus angular rotation of the prism module structure 100.

The computer module 28 operated pulse generators 29 which in turn activated the pump laser systems 21 and 22, and a modulator 30 for the probe laser 23. A digital oscilloscope 31 was connected with the boxcar integrator 27 so that scattering data ca be visibly displayed.

The probe beam 20 which was scattered formed output signals, being a transmitted beam 32 and a reflected beam 33. The transmitted beam 32 suffered negligible deflection on angular rotation of the prism module 100. The probe beam 20 is a planewave electromagnetic modulation signal directed into the guiding structure 12 at a non-normal angle relative to the interface 15 with the surrounding prisms 10 and 11 to the guiding structure 12. The outputted enhanced electromagnetic radiation signal was the transmitted beam 32 and reflected beam 33.

FIG. 6 shows the results of an active scattering in which the probe beam 20 was TM polarized. The upper trace shows the transmitted helium neon probe laser beam 32 detected voltage amplitude with the pump 19 present. The lower trace shows the helium neon laser transmitted beam 32 with the pump 19 absent. The upper trace shows the existence of pronounced discrete scattering resonances with angular half-width$\Delta\Psi\sim0.025$ degrees. The onset of resonant scattering occurred just beyond the critical angle for the prism-film interface 15. For the geometry of FIG. 5a where $\Delta\Gamma 0.6\ \Delta\Psi$. The finite width of these resonances is consistent with the finite angular spread /b associated with the helium neon laser probe beam 20 of diameter b and wavelength λ.

With $b\sim1$ mm, then $\lambda\ /b\sim0.036$ degrees, which is the correct order of magnitude. Individual measurements using the digital oscilloscope 31 confirmed that the scattering resonances occur simultaneously in the transmitted beam 32 and reflected beam 3. Resonant enhancement of the scattered field intensities on the order of 100 or greater were observed using a 6 μm thick active dielectric film.

Large amplitude electromagnetic scattering from active structures 12 are obtained with the system of the invention. Non-normal plane-wave electromagnetic scattering shows that resonant enhancement of the scattered field are achieved at discrete plane-wave incidence angles. These resonances correspond to the existence of unattenuated "leaky" waveguide modes on the active dielectric film 12 that are phase matched to the incident plane wave. The resonant scattering is in phase matching between the incident plane wave and a natural mode of oscillation of the interior dielectric film 12.

In using the term "surrounding" in relationship to the guiding structure, this shall be understood to be wholly or partially about the structure. The term "material" includes gases such as air and liquids and solids.

In different constructions the refractive index of the active structure 12 is different to the surrounding 10 on the one interface 15, and is different again from the refractive index of the surrounding 11 of the other interface 15. The three refractive indices of the exemplary three-layer structures can thereby provide different properties to the inputted probe beam 20, and the reflected beam 33 and transmitted beam 32.

Resonant electromagnetic scattering in thin active dielectric films, an active guiding structure, have a large number of useful applications. These include the realization of new laser structures based upon resonant leaky waveguide mode interactions.

Some of these applications are discussed in more detail.

OSCILLATORS

A "transmission or reflection mode" oscillator was constructed by placing high reflectivity dielectric mirrors 34, 35 and 36 at port 1 and ports 2 or 3 on the path of the probe beam 20, transmitted beam 32, and reflected beam 33, respectively. Oscillation was achieved in both configurations using a 6 $\mu$m thick active dielectric film 12 as the guiding structure. The output power as viewed through a narrow band helium neon laser line filter was TE polarized. At least about 100 times greater power was obtained during resonant scattering in the same frequency band than in either a non-resonant state or a non-active guiding structure. Measurements using a 12 $\mu$m active film 12 placed the energy extraction efficiency for a "transmission mode" oscillator at least at 18 percent.

Among other oscillator applications of the leaky guiding structure resonant scattering technology is the provision of various wavelength tunable dye laser oscillators. Both transmission and reflective oscillator configurations are wavelength tunable with very small changes in the angle $\Psi$. The tuning sensitivity was estimated to be about 5Å/millidegree for an oscillator constructed using a 12 $\mu$m thick dielectric film 12. Tuning can be effected rotating the prism module 100 or effectively changing the angle of incidence by other techniques.

Other oscillators are possible using the basic device shown in FIGS. 5a and 5b. A multiple cavity device may be constructed using mirrors 34, 35 and 36 at ports 1, 2 and 3, respectively. The power out is coupled in a fourth beam whose direction coincides with a "reflected" beam due to injection at port 2 or coincides with a "transmitted" beam due to injection at port 3.

A ring dye laser may be constructed by placing mirrors at ports 1 and 3. A third mirror is then used in such a way that light is reflected from the mirror at ports 1 or 3 impinges on the third mirror. The light is then reflected to port 3 or 1 so as to form a closed light path.

In another oscillation or amplifier embodiment the reflected beam or transmitted beam 32 is returned by mirrors 36 and 35 respectively to the guiding structure 12. An additional output beam 37 as indicated in phantom in FIG. 5a can be outputted from the guiding structure 12 and directed to another mirror 38. An appropriate oscillator or amplifier can be developed on this alignment and structure of components.

The advantages offered by oscillators and/or amplifiers using resonant "leaky" wave interactions include high energy extraction efficiency; and wavelength tunability with small relative angle changes. The frequency of such a laser may be scanned or "hopped" by placing a device in the laser cavity 12 whose purpose is to deflect the beam 20, 32 or 33 through small angles upon electronic command. Such beam deflection is accomplished using electro-optic, acousto-optic or magneto-optic devices which are available. High effective gain is an advantage of the amplifier and oscillator systems.

SOLID STATE STRUCTURES

Resonant "leaky" waveguide interactions in active dielectric films can be used to construct high-powered semiconductor laser structures, such as diode lasers.

Different and multiple semiconductor structures, multi-layers, different geometries and materials can be used to provide the required properties of the beam to be outputted or characteristics of the semiconductor to be provided. Different reflective interlayering or elements can be provided to fashion the described output beam or characteristics of the laser.

A semiconductor laser in an asymmetrical geometry using resonant interactions is shown in FIG. 8. The diode laser geometry structure 200 illustrated shows the substrate layer 50 and a layer or sheet 51 which forms within it both the guiding structure and the surrounding layers above the substrate 50.

The layer 51 includes an embedded active gain layer 52 which is the guiding structure. The layer 51 is formed, for instance, of a $Ga_xAl_{1-x}As$ material and the substrate 50 is formed, for instance, of GaAs. The refractive index of the layer 51 is $n_2=3.3$ and the refractive index of the substrate 50 is $n_1=3.619$. The sides 53 and 54 of the substrate 50 have antirreflective coatings 55 and 56. The thickness of the active layers 51 is 6 $\mu$m. The embedded active gain layer 52 is formed by InGaAsp material. A pump beam 57 is directed transversely through the structure 200. Mirrors 58 and 59 act to direct the input signal beams into and from the structure 200 to form an oscillation or amplifier as required. The exemplary beam wavelength is 1.32 $\mu$m. Resonant scattering in the first mode occurs at an incidence angle of approximately 24.30 and the required intensity gain coefficient in the 6 $\mu$m thick layer is less than 17 $cm^{-1}$.

Such laser structures have significant advantages over traditional diode laser structures. These advantages include the ability to have large mode volume with mode control. The output beam can be of high power, a single frequency, and a single mode, since higher order modes are discouraged by the structure. The mode "shape" a nearly plane-wave output beam, for a similar input beam. This structure should be less sensitive to thermal problems since there is a relatively greater dispersion of focused energy in the active region of the structure, such as the output faces from the structure. This should provide semiconductor laser structure of higher reliability and longer life.

Additionally, the geometry of FIG. 8 is scalable for instance, in series relationship, as shown in FIG. 9. External ode control is possible since only a resonant mode with the proper angle of incidence o is amplified and regenerated by the external mirrors 58 and 59 to cause oscillation. Lossy regions 61 between resonant reflections in the active sheets 51 quench parasitic oscillations. Additional reflection areas 62 are located at an opposite face of the substrate 50 from which the wave beam 60 is reflected back to the active elements 51. In this manner transmission of a beam 60 is enhanced and increased amplification an oscillation is achieved.

The construction of FIG. 9 illustrates active elements structures 200 incorporating the guiding structures 51 in relative series relationship wherein the selected frequency of the beam input is enhanced in its output characteristics. An appropriate number, n, structures are formed in a relative series relationship to generate an enhanced output or oscillator beam 60 as illustrated.

The pump beam 57 is an optical pump beam as illustrated in FIGS. 8 and 9. In other constructions the pump beam can be replaced by an electrical current. The reflector 62 at the remote of the substrate can be formed of a metal, semiconductor coating or material or air so as to provide the desired refractive index. Similarly the interface 64 as the opposite side of the layer 51 can be air or a contact metal providing the appropriate refractive index.

INTERNAL NONLINEAR EFFECTS

The internal field in the leaky waveguiding structure at resonance are much larger than the equivalent internal field in a conventional laser oscillator. In conventional laser oscillations, nonlinear effects are enhanced by the internal field to some power, namely, squared or greater. In FIG. 10, the increased intensity of the scattered field of the second mode in the resonant active guiding structure is illustrated. This highly increased field int eh guiding structure is used in benefitting form the non-linear properties of the guiding structure. The leaky guiding structures are used in the following exemplary ways with nonlinear field effects in the active region of the gain material.

A. Laser Structures That Use Nonlinear Conversion, Namely, Are Raman Lasers Using Active Films This laser uses the Raman shifting of the solvent for dye gain media. As the fields are substantially increased inside the active region, the nonlinear phenomena, which typically respond to the fields to some high power, for instance, 4th or 6th, are strongly enhanced. As reflector modes are possible, an effective double guiding structure is resonant both at the fundamental and nonlinear frequencies. By using the benefits of the high gain, the linear response of the laser provides for high fundamental frequency advantages. Simultaneously from the same structure the nonlinear characteristics provide the benefits from a Raman shifting in the structure. The incidence angle $\alpha$ for the input beam associated with the linear effects can be different to the incidence angle of a second input beam associated with the non-linear effects. The different inputs can be directed to different interfaces int eh guiding structure.

B. Generation of Second Harmonic Waves in a Nonlinear Active Film

A frequency doubled laser is realized in which there is no need for a separate nonlinear crystal to frequency double the fundamental laser frequency. Lasing and frequency conversion occurs simultaneously in the nonlinear active dielectric film when there is proper phase matching of the fundamental and second harmonic waves at resonance.

C. Difference Frequency Generation in a Nonlinear Active Film

Different frequencies $W_1$ and $W_2$ are mixed in a nonlinear active film, each satisfying the resonance condition. Parametric oscillation is achieved in a single nonlinear active film using resonant "leaky" waveguide interactions. With proper phase matching, and resonant interaction, the difference frequency $W_1 - W_2$ is generated with higher efficiency than is typical in the prior art.

Many other applications exist to use the resonant leaky wave effects described. Additional examples are set out.

1. Active mirrors, namely, mirrors which reflect a beam when activated. Otherwise, low reflectivity occurs when the guiding structure is in a passive condition.

2. High gain optical/electromagnetic amplifiers.

3. Directionally-dependent amplifiers, namely, spatial filter applications and orthogonal "k" vector filters. This application selects from multiple input beams in different directions. Only a single output beam at the selected angle and resonance condition is selected.

4. Gyroscopic devices.

The enhanced gain of the structure permits for tolerance of more losses in the optical system. More control devices can therefore be inserted in the optical path, and still provide a useful application. Additionally, due to the natural reflection mode operation of the device, many cavity designs are possible, including interlocking geometries, such as FIG. 8's. By operating and incorporating these devices into structures for gyroscope operation effective applications and devices are achieved with the leaky wave guiding system of the invention.

A gyroscope application is illustrated in FIG. 11. In FIG. 11, a gyroscope device is shown with the guiding structure 300 and optical reflective means 301, 302, and 303. The light beam circulates along the optical path in both directions 304 and 305.

By rotating the devices 306 about axis 307, Doppler downshifts are generated in one rotational direction and Doppler upshifts are generated in the opposite direction. Measuring the frequency shift permits for operation of a gyroscope.

In another gyroscope application as illustrated in FIG. 12, the geometry in a FIG. 8 pattern is set out. Additional optical paths 308 and 309 are created through the same guiding structure 300. Rotation of the device 310 about any suitable axis permits for gyroscopic operation.

The structures of 306 or 310 can be developed in a monolithic element. The various optical reflective elements can be formed by selected materials or different end or top faces, the element with the faces suitable shaped and directed. Structures can be arranged with different geometric forms of active and non-active materials, for instance, interlayered. In another form, the structure has active material dispersed in inactive material.

Many other forms of the invention exist, each differing from the other in matters of detail only. The above examples are to be considered as illustrative only. The scope of the invention is to be determined solely by the following claims.

We claim:

1. A method of enhancing the output of electromagnetic radiation comprising activating a guiding structure by exciting an interaction medium in the structure, directing an input signal of electromagnetic radiation into the guiding structure at a predetermined non-normal angle relative to an interface with the structure, obtaining an enhanced electromagnetic radiation output signal from the activated structure at a non-normal angle relative to the interface developing oscillations between the input signal and the output signal, and including effecting reflection in a path for the input signal and a path for the output signal thereby to effect oscillation.

2. A method as claimed in claim 1, wherein the guiding structure supports at least leaky waves and the output signal is at least one of an interface refection signal or an interface transmitted signal.

3. A method as claimed in claim 2, including developing an oscillator with the input signal, and selectively reflecting the interface reflected signal and the interface transmitted signal into the guiding structure.

4. A method as claimed in claim 3, including directing the interface output signal along a path of the input signal or path for the other of the interface reflected output signal or interface transmitted output signal.

5. An oscillator having an enhanced output of electromagnetic radiation comprising an electromagnetic guiding structure, the structure being arranged for activation by exciting an interfaction medium in the structure, means for directing an input signal of electromagnetic radiation into the guiding structure at a predetermined non-normal angle relative to an interface with the structure, means for obtaining an enhanced electromagnetic radiation output signal form the activated structure at a non-normal angle relative to the interface, means for developing oscillations between the input signal and the output signal, and means for effecting reflection in a path for the input signal and a path for the output signal thereby to effect oscillation.

6. An oscillator as claimed in claim 5, wherein the guiding structure supports at least leaky waves and the output signal is at least one of an interface reflection signal or an interface transmitted signal.

7. An oscillator as claimed in claim 6, including means for developing an oscillator with the input signal, and means for selectively reflecting the interface reflected signal and the interface transmitted signal into the guiding structure.

8. A method of providing an enhanced output of electromagnetic radiation in a leaky electromagnetic guiding structure, the guiding structure being formed by a semiconductor material comprising directing an input signal of electromagnetic radiation into the guiding structure at a predetermined incidence angle, activating the guiding structure by exciting an interaction medium in the structure, directing the input signal through the activated structure to a first interface with a surrounding material, reflecting the signal from the first interface towards a second interface remote from the first interface, and reflecting the first interface reflected signal from the second interface to another activated structure, such that the reflected signals are progressively enhanced.

9. A method as claimed in claim 8, wherein the input signal is a plane wave input and the output signal is a plane wave output.

10. A method as claimed in claim 9, wherein between respective active structures, there is a lossy region or quenching parasitic signals.

11. A product for providing an enhanced output of electromagnetic radiation in a leaky electromagnetic guiding structure, the guiding structure being formed by a semiconductor material comprising means for directing an input signal of electromagnetic radiation into the guiding structure at a predetermined incidence angle, means for activating the guiding structure by exciting an interaction medium in the structure, means for directing the input signal through the activated structure to a first interface with an adjacent material, means for reflecting the signal from the first interface towards a second interface remote from the first interface, and means for reflecting the first interface reflected signal from the second interface to another activated structure, such that the reflected signals are progressively enhanced.

12. A product as claimed in claim 11, wherein between respective active structures, there is a lossy region for quenching parasitic signals.

13. A product as claimed in claim 11 including means for activating the structure.

14. A method of gyroscopically employing an enhanced radiation comprising electromagnetically activating an electromagnetic guiding structure, directing an input signal of electromagnetic radiation into the guiding structure at a predetermined non-normal angle relative to an interface with the structure, obtaining an enhanced electromagnetic radiation output signal from the activated structure at a non-normal angle relative to the interface and rotating the guiding structure about an axis; and wherein the guiding structure supports at least partly leaky waves and the output signal is at least one of an interface reflections signal or an interface transmitted signal.

15. A method of gyroscopically employing an enhanced radiation comprising electromagnetically activating an electromagnetic guiding structure, directing an input signal of electromagnetic radiation into the guiding structure at a predetermined non-normal angle relative to an interface with the structure, obtaining an enhanced electromagnetic radiation output signal from the activated structure at a non-normal angle relative to the interface and rotating the guiding structure about an axis; and wherein multiple input signals and output signals are generated, and including directing respective input signals and output signals along different optical paths.

16. A method as claimed in claim 15 wherein the optical paths constitute a FIG. 8 centered about the guiding structure.

17. A gyroscope employing an enhanced output of electromagnetic radiation comprising means for electromagnetically activating an electromagnetic guiding structure by executing an interaction medium in the structure, means for directing an input signal of electromagnetic radiation into the guiding structure at a predetermined non-normal angle relative to an interface with the activated structure, means for obtaining an enhanced electromagnetic radiation output signal from the structure at a non-normal angle relative to the interface and means for rotating the guiding structure about an axis; and wherein the guiding structure supports at least partly leaky waves and the output signal is at least one of the interface reflection signal or an interface transmitted signal.

18. A gyroscope employing an enhanced output of electromagnetic radiation comprising means for electromagnetically activating an electromagnetic guiding structure by executing an interaction medium in the structure, means for directing an input signal of electromagnetic radiation into the guiding structure at a predetermined non-normal angle relative to an interface with the activated structure, means for obtaining an enhanced electromagnetic radiation output signal from the structure at a non-normal angle relative to the interface and means for rotating the guiding structure about an axis; and including means for guiding the input signals and the output signals, and including means for directing respective input signals and output signals along different optical paths.

19. A gyroscope as claimed in claim 18, wherein the optical paths constitute a FIG. 8 centered about the guiding structure.

* * * * *